United States Patent [19]

Chen

[11] Patent Number: 5,509,361
[45] Date of Patent: Apr. 23, 1996

[54] FOLDING COLLAPSIBLE TABLE STAND

[76] Inventor: Fa-Shon Chen, No. 38, Lane 360, Chien Chia Road, Hsin Chu Hsien, Taiwan

[21] Appl. No.: 308,568

[22] Filed: Sep. 19, 1994

[51] Int. Cl.⁶ .................................................. A47B 3/00
[52] U.S. Cl. ..................... 108/131; 108/129; 108/160; 248/439; 403/113; 403/252; 403/262; 403/231
[58] Field of Search .................... 108/429, 123, 108/130, 131, 160, 132; 248/439, 166; 403/112, 113, 117, 102, 244, 252, 247, 262, 231

[56] References Cited

U.S. PATENT DOCUMENTS

| | | | |
|---|---|---|---|
| 2,038,143 | 4/1936 | Swanson | 403/102 |
| 2,343,537 | 3/1944 | Saussurc | 108/132 |
| 3,009,719 | 11/1961 | Otto et al. | 403/252 |
| 3,046,073 | 7/1962 | Saussurc | 108/129 X |
| 3,392,689 | 7/1968 | Ferdinand et al. | 108/153 X |
| 3,556,569 | 1/1971 | Bruhn | 403/262 |
| 3,563,592 | 2/1971 | Preston | 403/102 X |
| 4,318,353 | 3/1982 | Schier | 108/130 X |
| 4,341,164 | 7/1982 | Johnson | 108/129 X |

FOREIGN PATENT DOCUMENTS

| | | | |
|---|---|---|---|
| 907085 | 2/1946 | France | 108/129 |
| 3275006 | 12/1991 | Japan | 108/160 |
| 283431 | 1/1928 | United Kingdom | 108/131 |

*Primary Examiner*—Peter M. Cuomo
*Assistant Examiner*—Janet M. Wilkens

[57] ABSTRACT

A folding collapsible table stand including a mounting frame fixed to a table board at the bottom, two pairs of stand legs pivoted to the mounting frame, two horizontal braces connected between the stand legs, and four folding struts connected between the mounting frame and the stand legs, wherein each horizontal brace has a plurality of retaining strips at both ends respectively inserted into respective retaining holes on the stand legs and then secured in place by screw bolts inside the stand legs; each folding strut consists of a base frame and a flat connecting rod pivotably connected together, and a guard plate hinged to one side of the base frame and releasably secured in the closed position by a snap to hold down the folding strut in the operative position.

4 Claims, 8 Drawing Sheets

FIG. 1

PRIOR ART

FOLDING COLLAPSIBLE TABLE STAND

BACKGROUND OF THE INVENTION

The present invention relates to a folding collapsible table stand which comprises guard plates releasably secured in the closed position by snaps, to hold down the folding struts of the table stand in the operative position.

Figure 1:
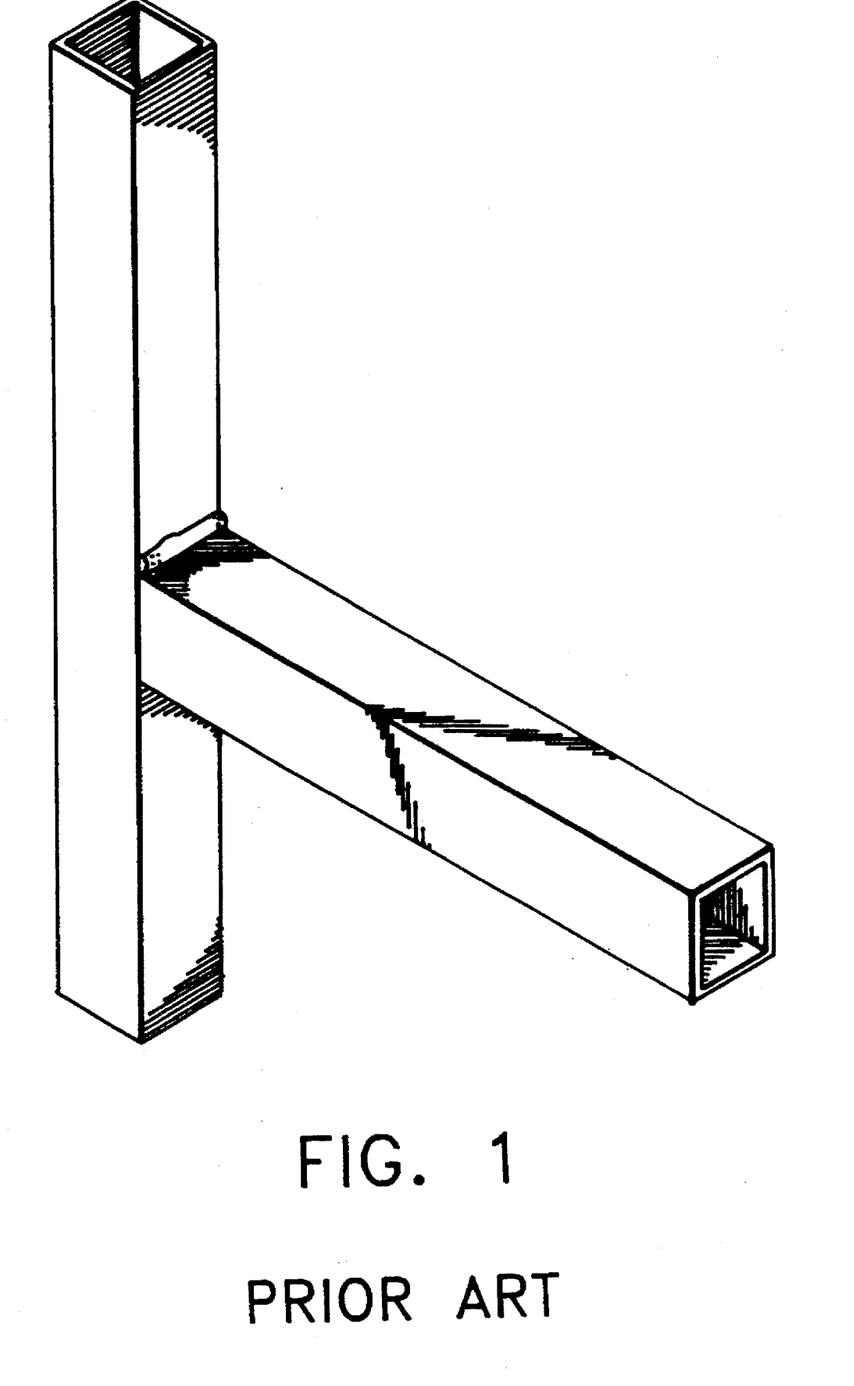
FIG. 1 shows a stand brace welded to a stand leg according to the prior art.

There is known a folding collapsible table stand for a folding collapsible table, which comprises a mounting frame fixed to the bottom of the table board, two opposite pairs of stand legs pivoted to the mounting frame at the bottom, two stand braces transversely connected between the stand legs by welding, and a plurality of folding struts connected between the mounting frame and the stand legs. When the folding collapsible table is not in use, it can be collapsed into a flat structure for delivery or storage. This folding collapsible table stand is functional, however it has drawbacks. Because the stand braces are welded to the stand legs (see FIG. 1), the sense of beauty around the connecting area between the stand braces and the stand legs is destroyed. Another drawback of this structure of folding collapsible table stand is that the welding process to connect the stand braces to the stand legs requires special techniques. Still another drawback of this structure of folding collapsible table stand is that the folding struts may be forced to collapse easily when the stand legs are pushed inwards by an external force, and therefore this structure of folding table stand is not stable in use. If children play around the folding collapsible table, they may be jammed in the folding collapsible table stand as the folding collapsible table stand is pushed to collapse suddenly.

SUMMARY OF THE INVENTION

The present invention has been accomplished to provide a folding collapsible table stand which eliminates the aforesaid drawbacks. According to one aspect of the present invention, each stand brace has a plurality of retaining strips at both ends respectively inserted into respective retaining holes on the stand legs and then secured in place by screw bolts inside the stand legs. Because the screw bolts are disposed inside the stand legs, they do not destroy the sense of beauty of the stand. According to another aspect of the present invention, there are two pairs of folding struts operated respectively for either pair of stand legs each folding strut consists of a base frame and a flat connecting rod pivotably connected together, and a guard plate hinged to one side of the base frame and releasably secured in the closed position by a snap to hold down the folding strut in the operative position. When the guard plates of the folding struts are respectively secured in the closed position, the folding struts are prohibited from being collapsed. Therefore, the stability of the stand is secured.

DETAILED DESCRIPTION OF THE PREFERRED EMBODIMENT

Figure 2:
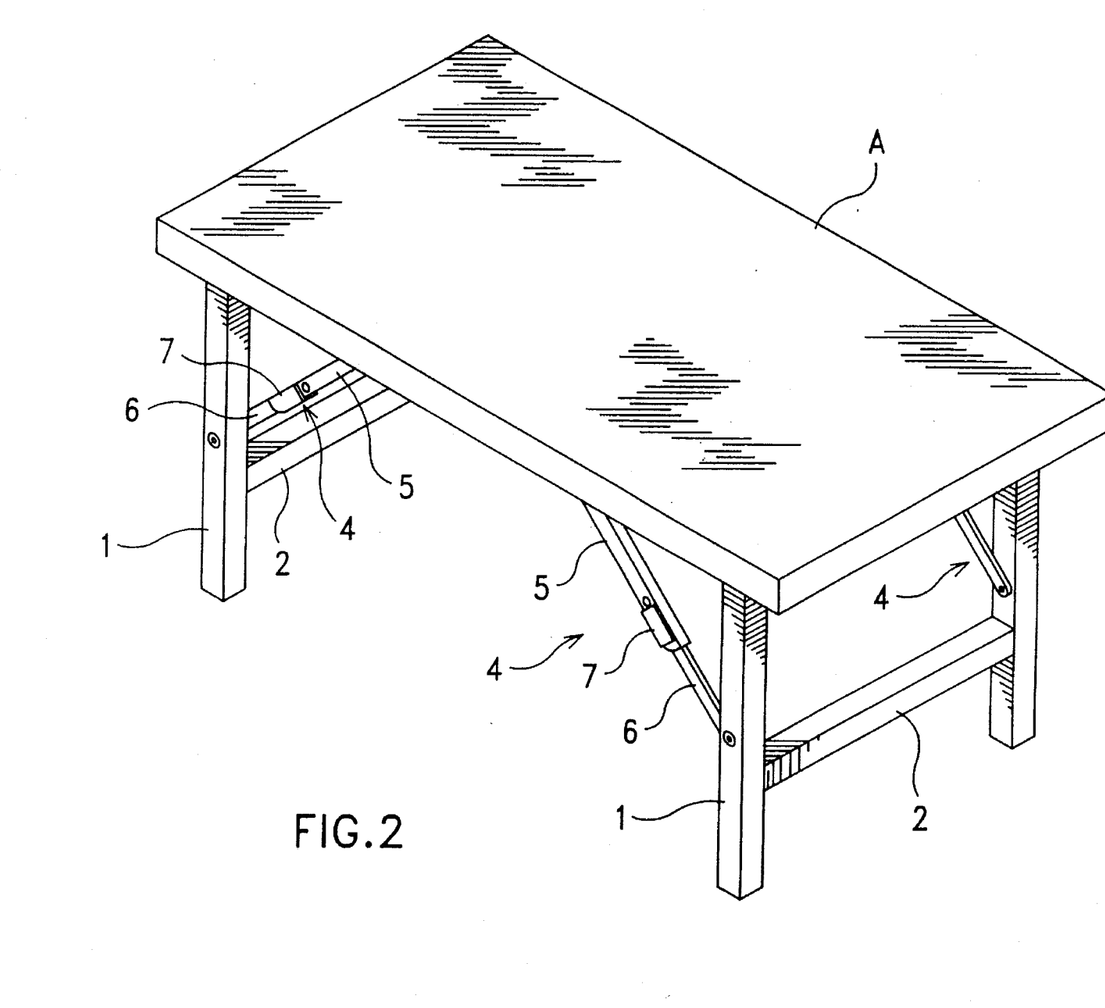
FIG. 2 is an oblique view of a table according to the present invention.
Figure 3:
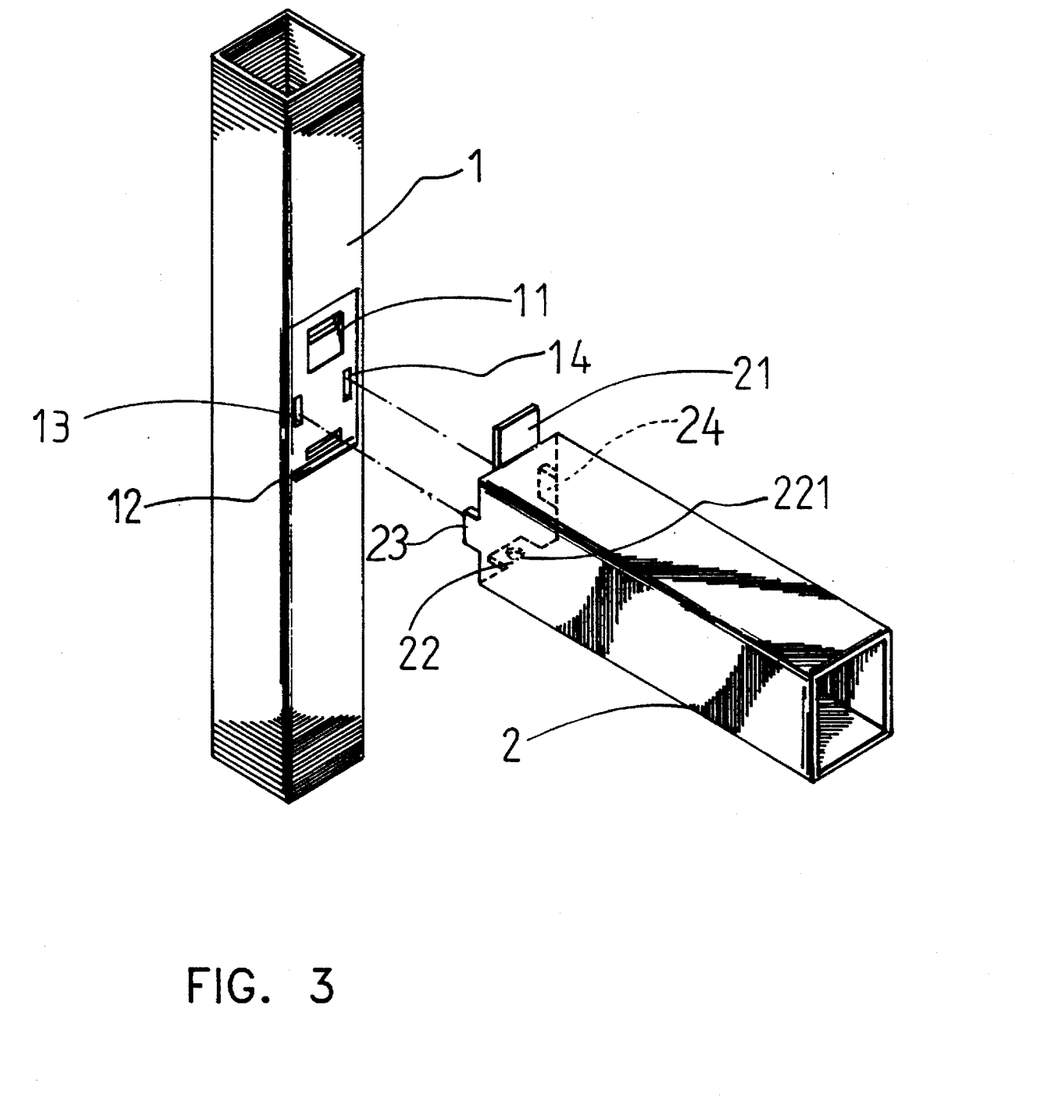
FIG. 3 shows the coupling structures of the stand leg and the horizontal brace according to the present invention.
Figure 4:
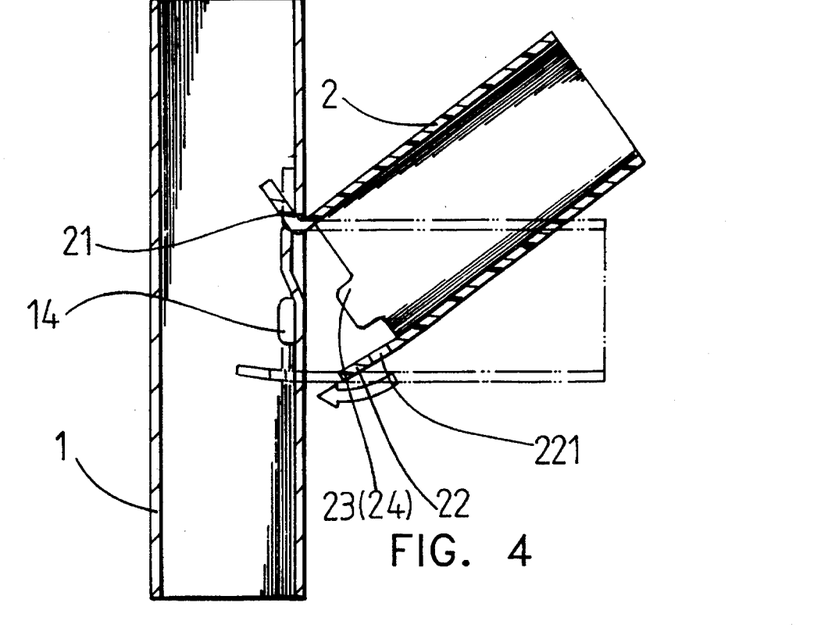
FIG. 4 shows the connection between the horizontal brace and the stand leg of FIG. 3.
Figure 5:
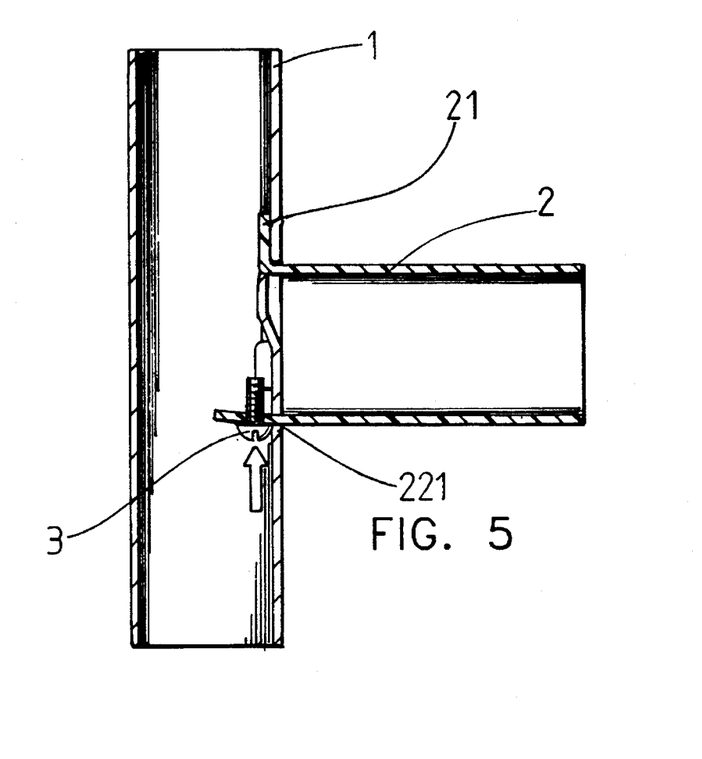
FIG. 5 shows the horizontal brace of FIG. 4 secured in position by a screw bolt.
Figure 6:
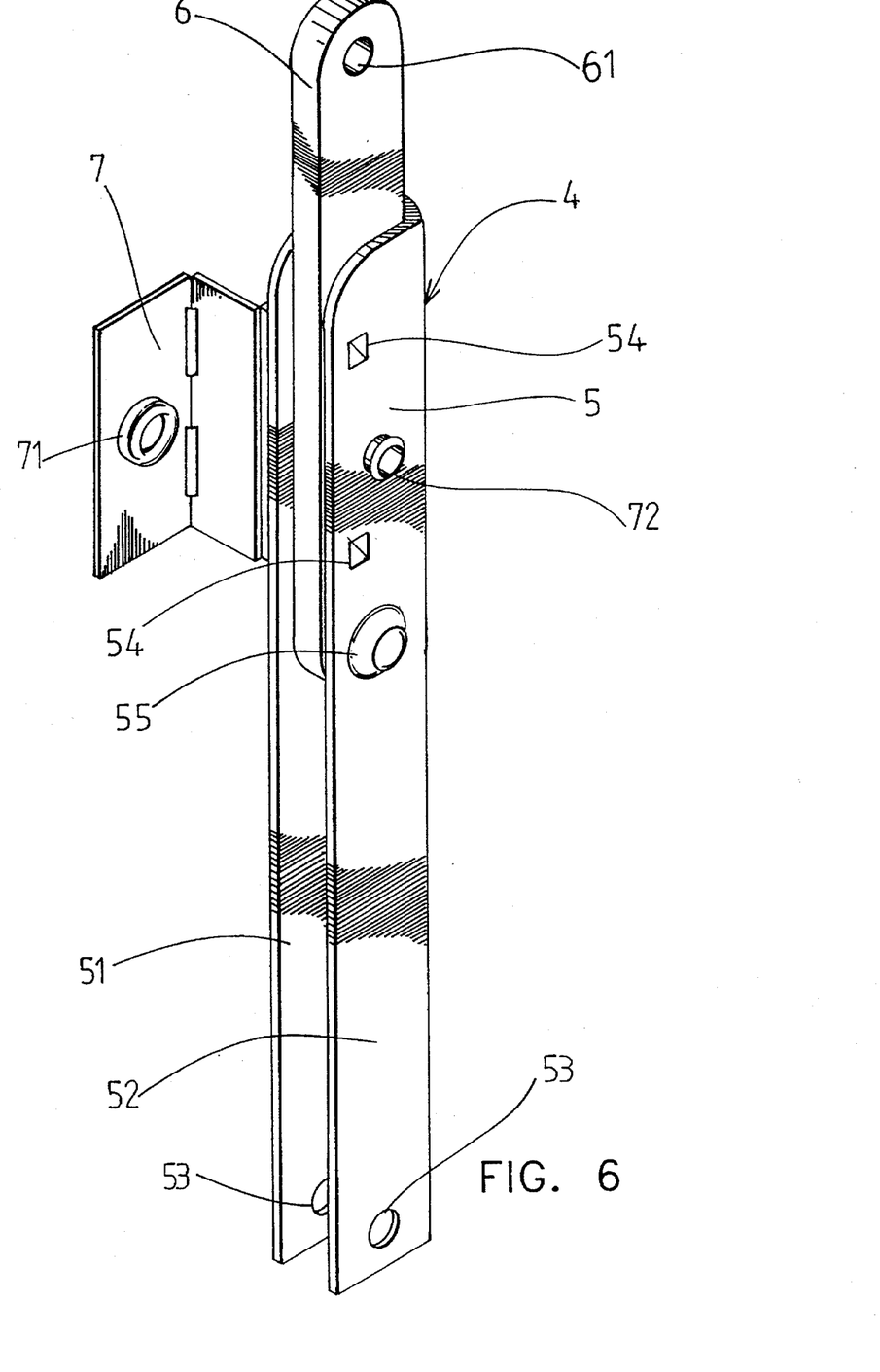
FIG. 6 is an elevational view of a folding strut according to the present invention.
Figure 6A:
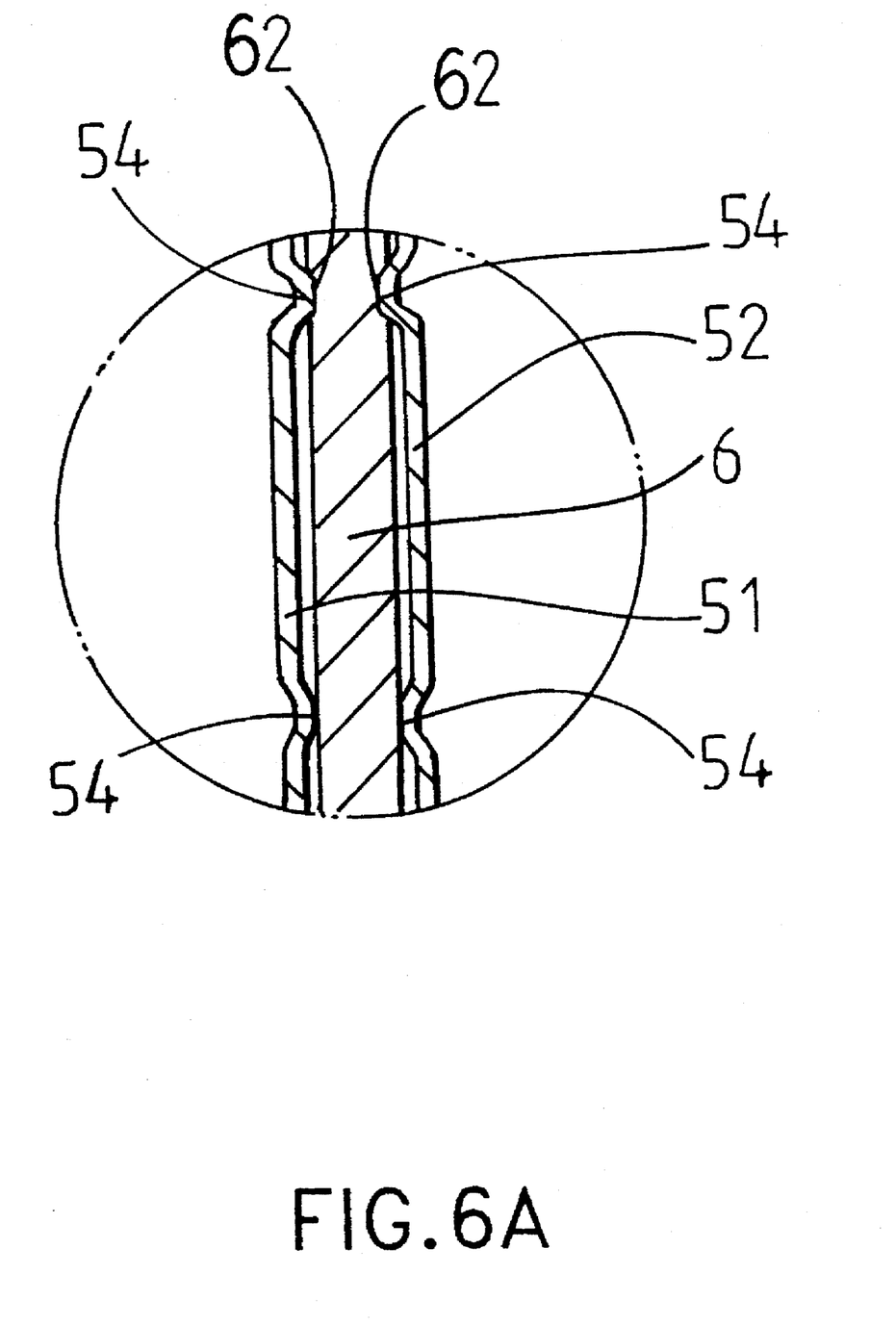
FIG. 6A is a partial view in section of the folding strut shown in FIG. 6.
Figure 7:
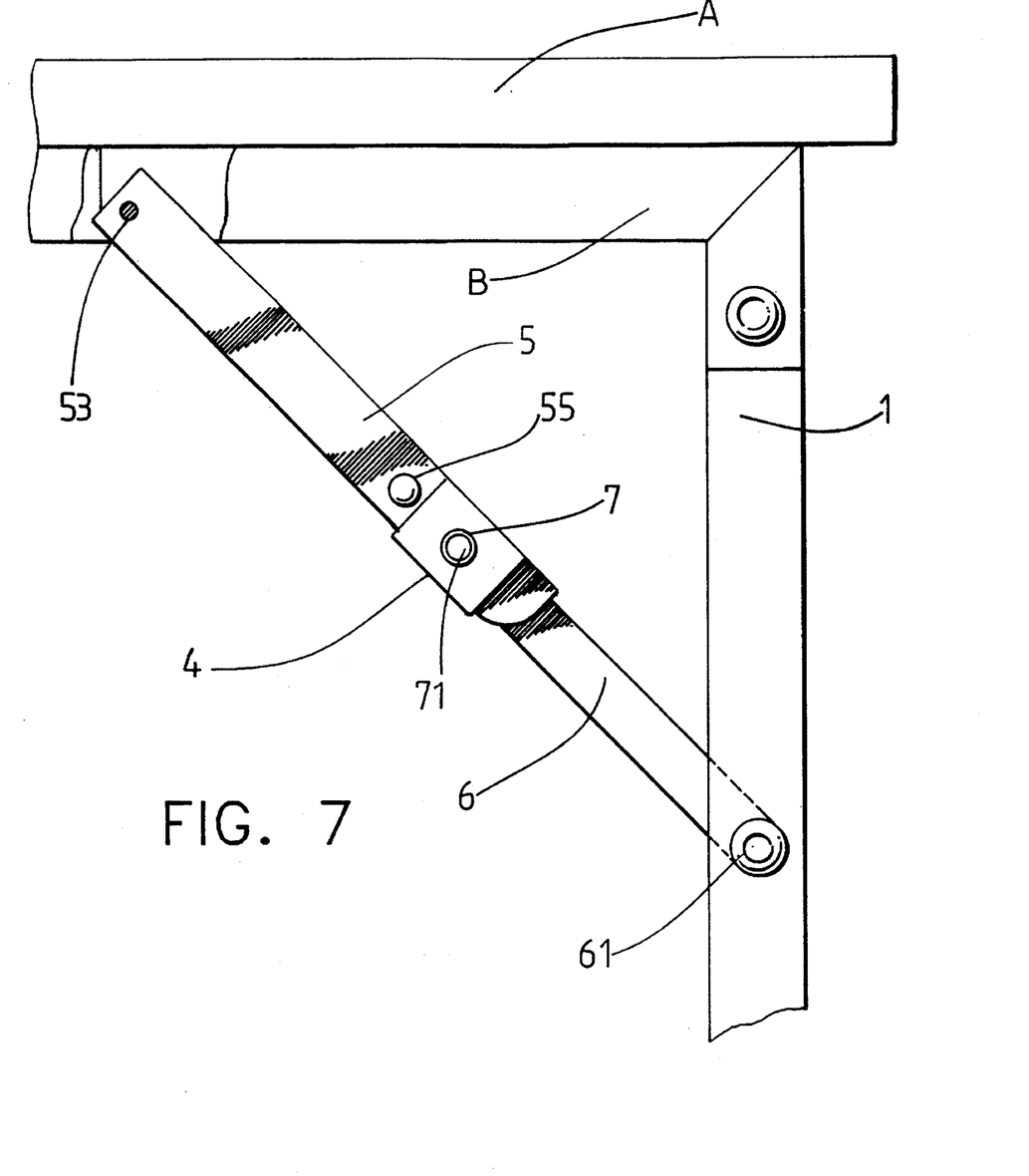
FIG. 7 shows the folding strut of FIG. 6 installed.
Figure 8:
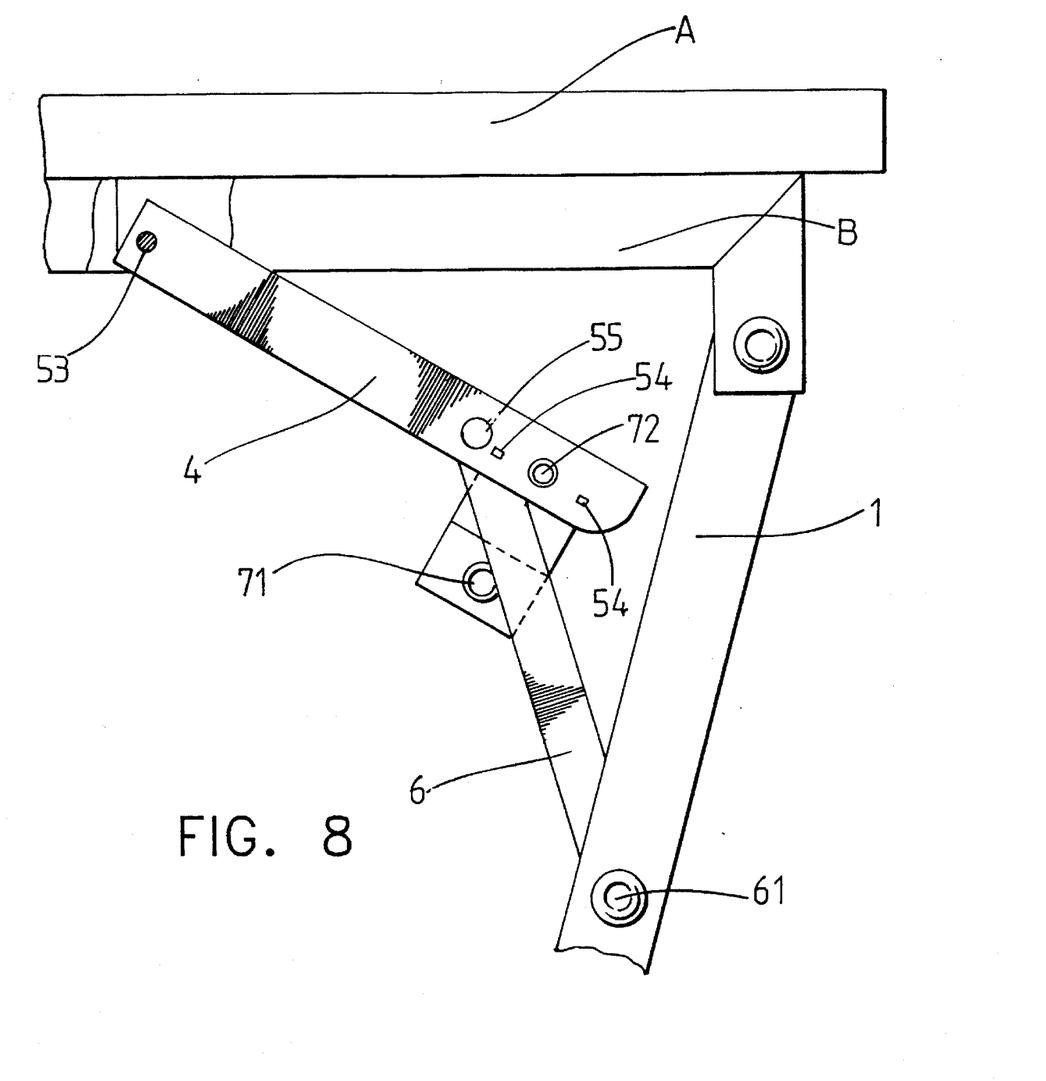
FIG. 8 shows the folding strut of FIG. 7 collapsed.

Referring to FIGS. 2, 7, and 8, a folding collapsible table stand in accordance with the present invention is generally comprised of a mounting frame B fixedly fastened to a table board A at the bottom, two symmetrical pairs of stand legs 1 bilaterally pivoted to the mounting frame B at the bottom, two horizontal braces 2 transversely respectively connected between a pair of stand legs 1, and two pairs plurality of folding struts 4 respectively obliquely connected between the mounting frame B and either pair of stand legs 1.

Referring to FIGS. 2, 3, 4, and 5, the stand leg 1 is made from a hollow bar having a coupling structure at one side thereof at a suitable elevation, which comprises a top retaining hole 11, a bottom retaining hole 12, and two opposite lateral retaining holes 13 and 14. The horizontal brace 2 has a coupling structure at one end for coupling to the coupling structure of the stand leg 1. The coupling structure of the horizontal brace 2 comprises a top retainer strip 21, a bottom retainer strip 22 with a screw hole 221, and two opposite lateral retainer strips 23 and 24. The bottom retainer strip 22 and the lateral retainer strips 23 and 24 are extended outwards from the horizontal brace 2 in direction along the length of the horizontal brace 2. The top retainer strip 21 extends from the horizontal brace 2 at right angles. Therefore, when the top retainer strip 21 is disposed in vertical direction, the bottom retainer strip 22 and the lateral retainer strips 23 and 24 are disposed in horizontal direction. When the top retainer strip 21, bottom retainer strip 22 and lateral retainer strips 23 and 24 of the horizontal brace 2 are respectively inserted into the top retaining hole 11, bottom retaining hole 12 and lateral retaining holes 13 and 14 of the stand leg 1 (see FIG. 4), the top retainer strip 21 is closely attached to the inside wall of the stand leg 1, then a screw bolt 3 is inserted into the stand leg 1 and threaded into the screw hole 221 on the bottom retainer strip 22 to stop the bottom retainer strip 22 from moving out of the bottom retaining hole 12. Because the lateral retainer strips 23 and 24 are retained in the lateral retaining holes 13 and 14, the horizontal brace 2 is prohibited from being moved sideways. Because the coupling end of the horizontal brace 2 is stopped against the outside wall of the stand e.g. 1, the horizontal brace 2 is stopped from forward movement. Furthermore, because the top retainer strip 21 is stopped at the inside wall of the stand leg 1 and the screw bolt 3 is fastened to the bottom retainer strip 22 and stopped inside the bottom retaining hole 12, the horizontal brace 2 is prohibited from backward movement relative to the stand leg 1. Therefore, the stand leg 1 and the horizontal brace 2 are firmly retained together. Of course, the two opposite ends of the horizontal brace 2 are made symmetrical so that the horizontal brace 2 can be connected between two stand legs 1.

Referring to FIGS. 6, 6A, 7, and 8, the folding strut 4 comprises a base frame 5, a flat connecting rod 6, and a guard plate 7. The baseframe 5 is made from a channel bar, comprising two parallel side walls, namely, the first side wall 51 and the second side wall 52. Two pivot holes 53 are made on the parallel side walls 51 and 52 of the base frame 5 at one end and pivotably connected to the mounting frame B. The flat connecting rod 6 has one end pivotably connected to the base frame 5 by a pivot 55, which is disposed on the base frame 5 remote from the pivot holes 53, and an opposite end made with a pivot hole 61 pivotably connected to the corresponding stand leg 1. The flat connecting rod 6 has a plurality of recessed portions 62 on two opposite sides thereof. The base frame 5 further comprises a plurality of inward projections 54 respectively raised from the parallel side walls 51 and 52 on the inside. When the folding strut 4 is extended out by turning the flat connecting rod 6 outwards from the base frame 5, the recessed portions 62 of the flat connecting rod 6 are forced to engage with the inward projections 54 (see FIG. 6A), and therefore thee flat connecting rod 6 does not oscillate between the parallel side walls 51 and 52. The guard plate 7 is made from flexible material and hinged to the first side wall 51 of the base frame 5, having a socket 71 on an inside wall thereof. The second side wall 52 of the base frame 5 is made with a stab 72 on the outside. When the flat connecting rod 6 is turned outwards from the base frame 5 and the inward projections 54 are forced into the recessed portions 62 respectively, the guard plate 7 is fastened to the second side wall 52 and covered over the flat connecting rod 6 by fitting the stud 72 into the socket 71 (see FIGS. 6 and 7).

Referring to FIG. 8 again, when the guard plate 7 is disconnected from the second side wall 52 of the base frame 5, the flat connecting rod 6 can then be turned inwards to collapse the respective stand leg 1. Therefore, the folding collapsible table stand can be collapsed and received to the mounting frame B.

While only one embodiment of the present invention has been shown and described, it will be understood that various modifications and changes could be made without departing from the spirit and scope of the invention. For example, the flat connecting rod 6 may have only one opposite pair of recessed portions 62, the base frame 5 may have two opposite pairs of inward projections 54. When the folding strut is extended out, one pair of the inward projections 54 engage the recessed portions 62 while the other pair of the inward projections 54 bilaterally stop against the two opposite flat surfaces of the flat connecting rod 6 to hold down the flat connecting rod 6 against oscillation.

What is claimed is:

1. A folding collapsible table stand comprising a mounting frame fixedly fastened to a bottom wall of a flat table board, two symmetrical pairs of hollow stand legs bilaterally pivoted to said mounting frame for supporting it on the ground, two horizontal braces transversely respectively connected between said stand legs to make two opposite symmetrical pairs of said stand legs, and two pairs of folding struts respectively obliquely connected between said mounting frame and either pair of said stand legs, wherein:

said hollow stand legs have a respective coupling device respectively coupled to said horizontal braces, the coupling device of each stand leg comprising a top retaining hole, a bottom retaining hole, and two opposite lateral retaining holes;

each horizontal brace has two opposite ends and two coupling devices respectively made on the two opposite ends, the coupling device at each end comprising, a top retaining strip, a bottom retaining strip, and two opposite, lateral retaining strips respectively fastened to the top, bottom and lateral retaining holes of said coupling device of the said stand leg; and each folding strut comprises a base frame made from a channel bar, a flat connecting rod, and a guard plate, said base frame having one end pivotably connected to said mounting frame by a pivot and an opposite end pivotably connected to said flat connecting rod by a pivot, said flat connecting rod having one end pivotably connected to said base frame and an opposite end pivotably connected to the cooperating stand leg by a pivot, said guard plate being hinged to one side wall of said base frame and releasably secured in a closed position by a fastener to hold down said flat connecting rod in an extended-out position, said fastener comprising a stud made on an opposite side wall of said base frame and a socket made on said guard plate for receiving said stud.

2. The folding collapsible table stand of claim 1 wherein said bottom retainer strip of each end of said horizontal brace comprises a screw hole, which is threaded with a respective screw bolt after said bottom retainer strip is inserted into said bottom retaining hole of the cooperating stand leg, said screw bolt being stopped inside said cooperating stand leg to prohibit the cooperating horizontal brace from backward movement.

3. The folding collapsible table stand of claim 1 wherein said flat connecting rod comprises a plurality of recessed portions symmetrically disposed on two opposite flat surfaces thereof; said base frame comprises a plurality of inward projections symmetrically raised from the two opposite side walls thereof and respectively engaging said recessed portions to hold said flat connecting rod in said extended-out position.

4. The folding collapsible table stand of claim 3 wherein said base frame further comprises at least two inward projections symmetrically raised from the two opposite side walls thereon and respectively stop against the two opposite flat surfaces of said flat connecting rod.

\* \* \* \* \*